(12) United States Patent
Klasen-Memmer et al.

(10) Patent No.: US 7,785,677 B2
(45) Date of Patent: Aug. 31, 2010

(54) LIQUID-CRYSTALLINE MEDIUM

(75) Inventors: Melanie Klasen-Memmer, Heuchelheim (DE); Volker Reiffenrath, Roβdorf (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 12/096,303

(22) PCT Filed: Dec. 8, 2006

(86) PCT No.: PCT/EP2006/011789

§ 371 (c)(1),
(2), (4) Date: Jun. 5, 2008

(87) PCT Pub. No.: WO2007/065693

PCT Pub. Date: Jun. 14, 2007

(65) Prior Publication Data

US 2008/0315157 A1    Dec. 25, 2008

(30) Foreign Application Priority Data

Dec. 8, 2005    (DE) .................. 10 2005 058 541

(51) Int. Cl.
C09K 19/30    (2006.01)
C09K 19/12    (2006.01)

(52) U.S. Cl. ............... 428/1.1; 252/299.63; 252/299.66

(58) Field of Classification Search .................. 428/1.1; 252/299.63, 299.66
See application file for complete search history.

(56) References Cited

U.S. PATENT DOCUMENTS

| | | | |
|---|---|---|---|
| 5,709,820 A | 1/1998 | Kato et al. | |
| 6,017,469 A | 1/2000 | Reiffenrath et al. | |
| 6,174,457 B1 | 1/2001 | Kato et al. | |
| 7,033,652 B2* | 4/2006 | Heckmeier et al. | 428/1.1 |
| 7,074,464 B2* | 7/2006 | Kato | 428/1.1 |
| 7,220,464 B2* | 5/2007 | Hirschmann et al. | 428/1.1 |
| 7,390,538 B2* | 6/2008 | Manabe et al. | 428/1.1 |
| 2002/0038858 A1 | 4/2002 | Kato et al. | |
| 2004/0161550 A1 | 8/2004 | Hirschmann et al. | |
| 2004/0161559 A1* | 8/2004 | Verrall et al. | 428/35.7 |
| 2005/0006624 A1* | 1/2005 | Kato | 252/299.63 |

FOREIGN PATENT DOCUMENTS

| | | |
|---|---|---|
| DE | 44 16 455 A1 | 11/1995 |
| DE | 44 41 963 A1 | 11/1995 |
| DE | 44 34 851 A1 | 4/1996 |
| DE | 10 2004 003 508 A1 | 8/2004 |
| EP | 0 747 336 B1 | 12/1996 |
| EP | 0 949 232 A1 | 10/1999 |
| WO | WO 95/30723 | 11/1995 |
| WO | WO 98/13321 | 4/1998 |
| WO | WO-2005007775 | * 1/2005 |

* cited by examiner

*Primary Examiner*—Shean C Wu
(74) *Attorney, Agent, or Firm*—Millen, White, Zelano, Branigan, P.C.

(57) ABSTRACT

The invention relates to a liquid-crystalline medium based on a mixture of polar compounds which comprises at least one compound of the formula (I) in which $R^{11}$, $R^{12}$ and $Z^1$ have the meanings indicated in Claim 1, and to the use thereof for an active-matrix display based on the ECB, FFS or IPS effect.

(I)

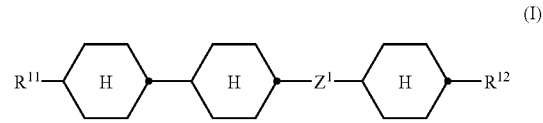

11 Claims, No Drawings

LIQUID-CRYSTALLINE MEDIUM

The invention relates to a liquid-crystalline medium based on a mixture of polar compounds which comprises at least one compound of the formula I

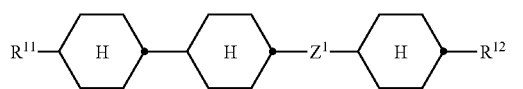

in which $R^{11}$ and $R^{12}$ each, independently of one another, denote an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

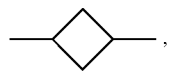

—C≡C—, —OC—O— or —O—CO— in such a way that O atoms are not linked directly to one another, with the proviso that at least one of the radicals $R^{11}$ and $R^{12}$ denotes alkenyl having 2 to 6 C atoms, and $Z^1$ denotes —CH=CH— or a single bond.

Media of this type can be used, in particular, for electro-optical displays having active-matrix addressing based on the ECB effect and for IPS (in-plane switching) displays. The medium according to the invention preferably has negative dielectric anisotropy.

Displays which use the ECB effect, as so-called VAN (vertically aligned nematic) displays in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753) and PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763) modes, have established themselves as one of the three more recent types of liquid-crystal display that are currently the most important, in particular for television applications, besides ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) displays and IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Like ASV displays, ECB displays use liquid-crystalline media of negative dielectric anisotropy (Δε), whereas TN displays and all conventional IPS displays to date use liquid-crystalline media of positive dielectric anisotropy.

In liquid-crystal displays of this type, the liquid crystals are used as dielectrics, the optical properties of which change reversibly on application of an electric voltage.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

In particular, the response times of the liquid-crystal media in the displays must be improved, i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications, and it therefore appears desirable to find further optimisation approaches.

None of the series of compounds having a liquid-crystalline mesophase disclosed hitherto includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were available hitherto.

Since in displays in general, i.e. also in displays in accordance with these mentioned effects, the operating voltage should be as low as possible, use is made of liquid-crystal media which are generally predominantly composed of liquid-crystal compounds which all have the same sign of the dielectric anisotropy and have the highest possible value of the dielectric anisotropy. In general, use is made of at most relatively small amounts of neutral compounds and if possible no compounds having the opposite sign of the dielectric anisotropy to the medium. In the case of the liquid-crystal media of negative dielectric anisotropy for ECB displays, use is thus predominantly made of compounds of negative dielectric anisotropy. The liquid-crystal media employed generally consist predominantly and usually even very substantially of liquid-crystal compounds of negative dielectric anisotropy.

Matrix liquid-crystal displays (MLC displays) are known. Non-linear elements which can be used for individual switching of the individual pixels are, for example, active elements (i.e. transistors). The term "active matrix" is then used, where a distinction can be made between two types:

1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays disclosed hitherto usually operate as TN cells with crossed polarisers in transmission and are back-lit.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORI-MACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantages of the MLC-TN displays disclosed hitherto are their comparatively low contrast, the relatively high viewing-angle dependence and the difficulty of producing grey shades in these displays.

There thus continues to be a great demand for MLC displays having very high specific resistance at the same time as a large working-temperature range, short response times and a low threshold voltage with the aid of which various grey shades can be produced.

The invention is based on the object of providing MLC displays, not only for monitor and TV applications, but also for mobile telephones and navigation systems, which are based on the ECB or IPS effect, do not have the disadvantages indicated above, or only do so to a lesser extent, and at the same time have very high specific resistance values. In particular, it must be ensured for mobile telephones and navigation systems that they also work at extremely high and extremely low temperatures.

Surprisingly, it has now been found that this object can be achieved if nematic liquid-crystal mixtures which comprise at least one compound of the formula I are used in these display elements. These liquid-crystal mixtures are distinguished by low values for the birefringence ($\Delta n$) and are therefore eminently suitable, inter alia, for screens of television sets, computers, such as, for example, notebooks or desktops, switchboards, but also of gambling machines, electro-optical displays, such as, for example, of watches, calculators, pocket electronic games, chess computers, portable data storage devices, such as PDAs (personal digital assistants), or of mobile telephones and navigation equipment.

The invention thus relates to a liquid-crystalline medium based on a mixture of polar compounds which comprises at least one compound of the formula I.

The mixtures according to the invention exhibit very broad nematic phase ranges with clearing points $\geq 70°$ C., very favourable values for the capacitive threshold, relatively high values for the holding ratio and at the same time very good low-temperature stabilities at $-30°$ C. and $-40°$ C. Owing to the low $\Delta n$ values, the mixtures according to the invention are furthermore distinguished by low rotational viscosities $\gamma_1$.

Some preferred embodiments of the mixtures according to the invention are indicated below:
a) $R^{11}$ in the compounds of the formula I preferably denotes alkyl or alkenyl having up to 6 C atoms, in particular straight-chain alkyl, vinyl, 1 E-alkenyl or 3-alkenyl.
b) If $R^{11}$ and/or $R^{12}$ denote alkenyl, the alkenyl radicals may be identical or different. If $R^{11}$ and/or $R^{12}$ denote an alkenyl radical, it is preferably $CH_2=CH$, $CH_3-CH=CH$, $C_3H_7-CH=CH$, $CH_2=CH-C_2H_5$ or $CH_3-CH=CH-C_2H_5$.
c) Liquid-crystalline medium which comprises one, two, three, four or more, preferably one, two or three, compounds of the formula I.
d) Liquid-crystalline medium in which the proportion of compounds of the formula I in the mixture as a whole is at least 2% by weight, preferably at least 4% by weight, particularly preferably 2-20%.
e) Liquid-crystalline medium which additionally comprises, independently of one another, one or more compounds of the formulae IIA and/or IIB

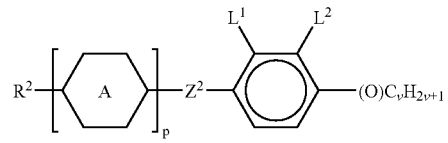

IIA

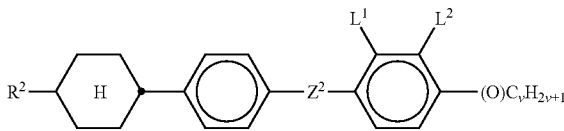

IIB in which

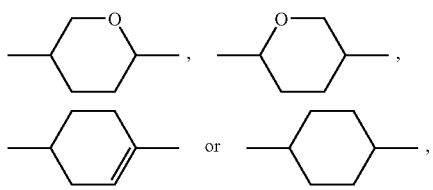
R² has the meaning of R¹¹,
Z² denotes a single bond, —CH=CH— or —CH₂CH₂—,
p denotes 1 or 2, and
L¹ and L² each, independently of one another, denote F, Cl, OCF₃, CF₃, CH₃, CH₂F, CHF₂, preferably L¹=L²=F,
v denotes 1 to 6.
Particularly preferred compounds of the formula IIA are the compounds of the formulae IIA-1 to IIA-18
IIA-1
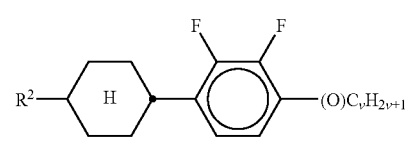
IIA-2
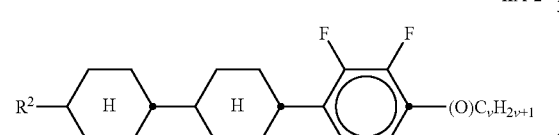
IIA-3
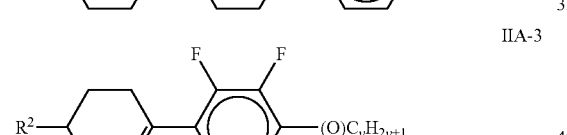
IIA-4
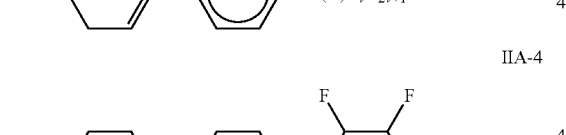
IIA-5
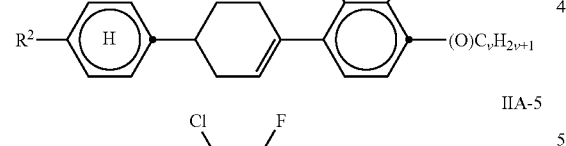
IIA-6
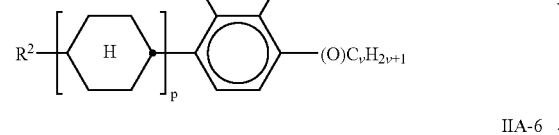
IIA-7
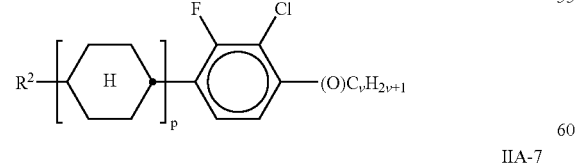
IIA-8
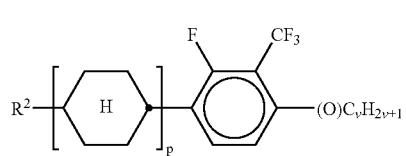
IIA-9
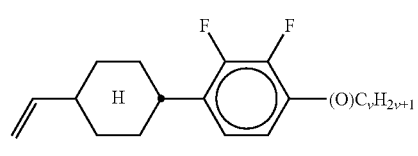
IIA-10
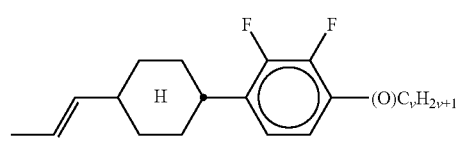
IIA-11
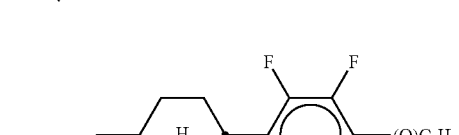
IIA-12
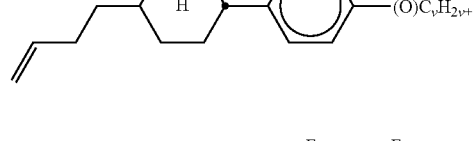
IIA-13
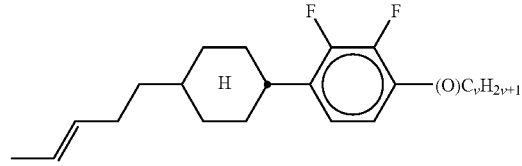
IIA-14
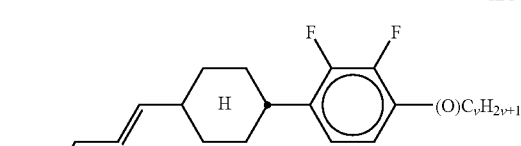
IIA-15
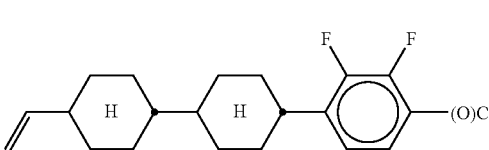
IIA-16
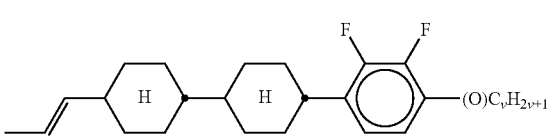

-continued

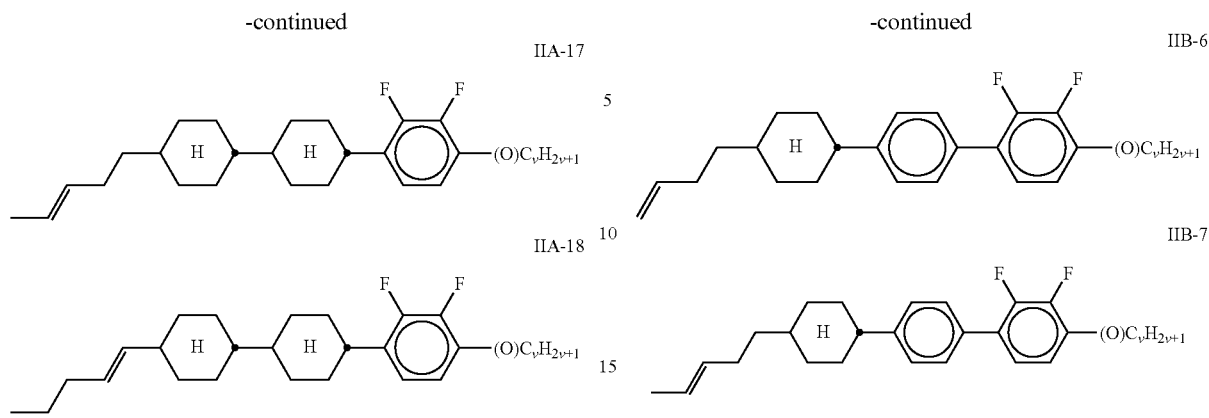

in which $R^2$ and v have the meanings indicated above.

Particular preference is given to the compounds of the formulae IIA-1 and IIA-2, furthermore IIA-3 and IIA-4. In the compounds of the formula IIA, $R^2$ preferably denotes straight-chain alkyl or alkenyl, preferably $CH_2=CH$, $CH_3CH=CH$, $CH_2=CHCH_2CH_2$, $CH_3CH=CHC_2H_4$, $C_3H_7CH=CH$, $CH_3$, $C_2H_5$, n-$C_3H_7$, n-$C_4H_9$, n-$C_5H_{11}$.

Particularly preferred compounds of the formula IIB are the compounds of the formulae IIB-1 to IIB-7

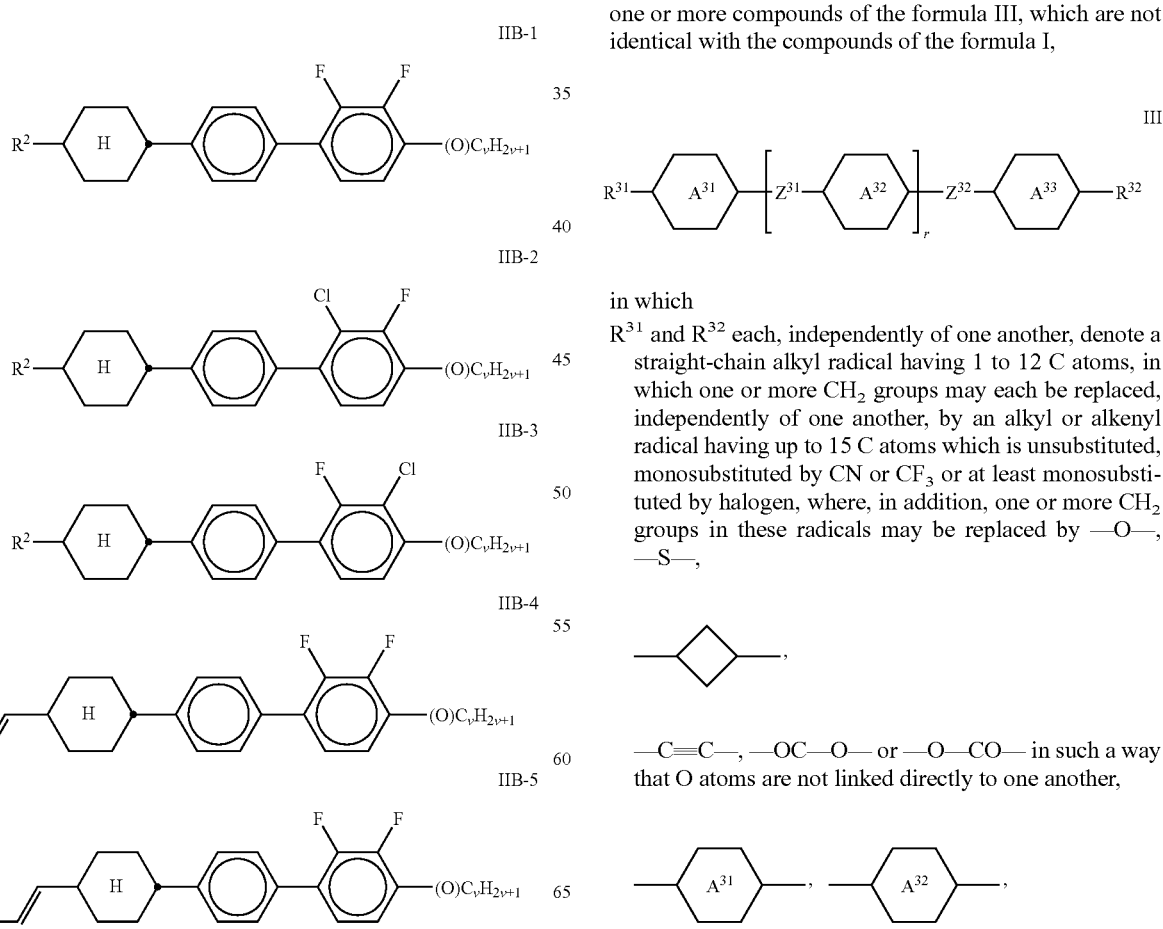

in which $R^2$ and v have the meanings indicated above.

Particular preference is given to the compounds of the formula IIB-1. In the compounds of the formula IIB-1, $R^2$ preferably denotes straight-chain alkyl. In the compounds of the formula IIB, $R^2$ preferably denotes straight-chain alkyl or alkenyl, preferably $CH_2=CH$, $CH_3CH=CH$, $CH_2=CHCH_2CH_2$, $CH_3CH=CHC_2H_4$, $C_3H_7CH=CH$, $CH_3$, $C_2H_5$, n-$C_3H_7$, n-$C_4H_9$, n-$C_5H_{11}$.

In the compounds of the formulae IIA and IIB, $Z^2$ preferably denotes a single bond.

f) Liquid-crystalline medium which additionally comprises one or more compounds of the formula III, which are not identical with the compounds of the formula I, $$R^{31}-A^{31}-[Z^{31}-A^{32}]_r-Z^{32}-A^{33}-R^{32} \quad \text{III}$$

in which $R^{31}$ and $R^{32}$ each, independently of one another, denote a straight-chain alkyl radical having 1 to 12 C atoms, in which one or more $CH_2$ groups may each be replaced, independently of one another, by an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

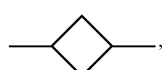

—C≡C—, —OC—O— or —O—CO— in such a way that O atoms are not linked directly to one another,

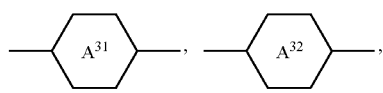

-continued

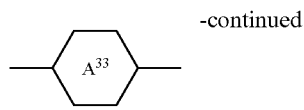

each, independently of one another, denote

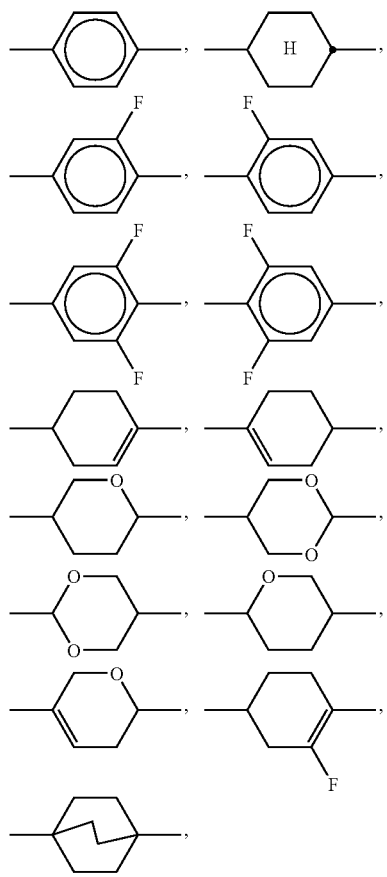

r denotes 0, 1 or 2,
Z$^{31}$ and Z$^{32}$ each, independently of one another, denote a single bond, —CH$_2$CH$_2$—, —C≡C—, —CH═CH—, —CF$_2$O—, —OCF$_2$—, —CF═CF—, —CF═CH—, —CH═CF—, —CH$_2$CF$_2$—, —CF$_2$CH$_2$—, —COO—, —OCO—, —CH$_2$O—, —OCH$_2$—, —(CH$_2$)$_4$—.

g) Liquid-crystalline medium in which the proportion of compounds of the formulae IIA and/or IIB in the mixture as a whole is at least 20% by weight.
h) Liquid-crystalline medium in which the proportion of the compounds of the formula III in the mixture as a whole is at least 5% by weight.
i) Liquid-crystalline medium which comprises at least one compound selected from the sub-formulae I1 and/or I2:

I1

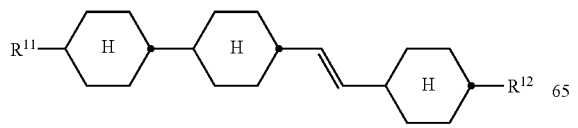

I2

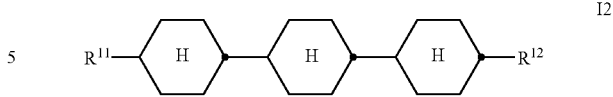

Particularly preferred media comprise one or more compounds selected from the group of the compounds of the formulae I1a

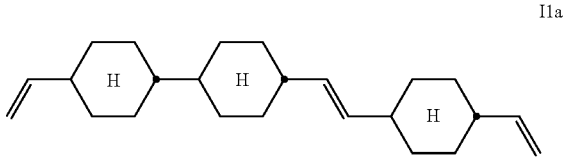

I1b

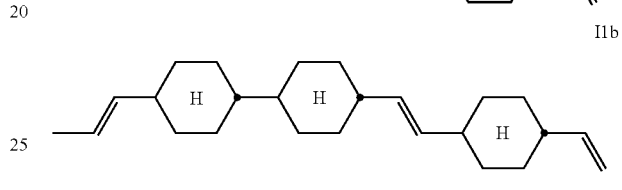

I1c

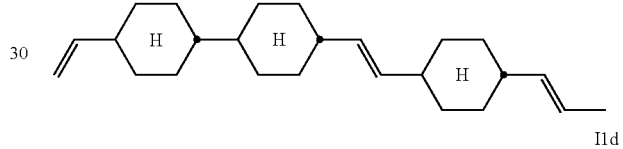

I1d

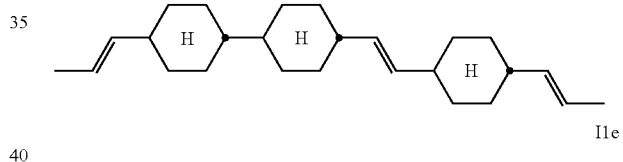

I1e

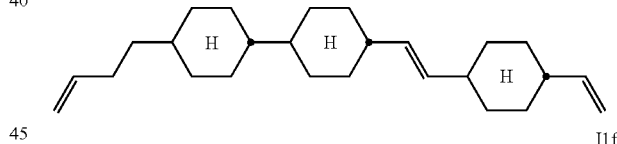

I1f

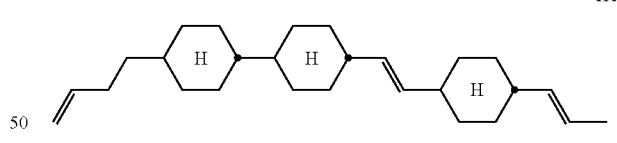

I1g

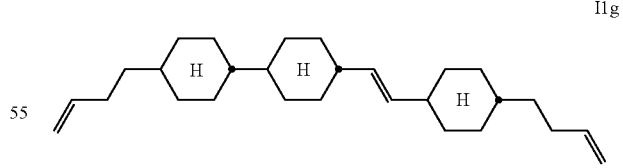

I2a

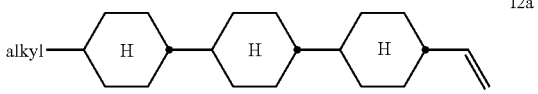

I2b

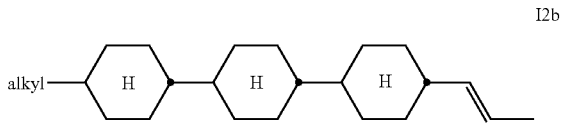

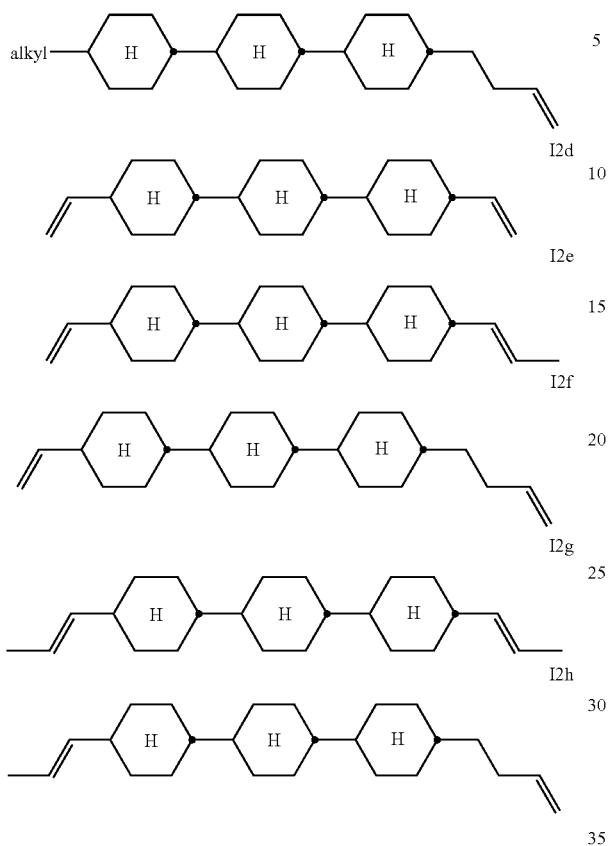

Particular preference is given to the compounds of the formulae I1a, I2a, I2c.

j) Liquid-crystalline medium which additionally comprises one or more compounds selected from the formulae IIIa to IIIq:

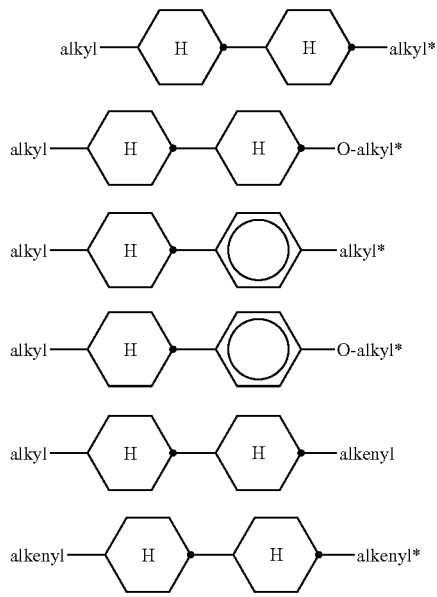

in which
alkyl and
alkyl* each, independently of one another, denote a straight-chain alkyl radical having 1-6 C atoms, and
alkoxy denotes a straight-chain alkoxy radical having 1-6 C atoms,
alkenyl and
alkenyl* each, independently of one another, denote a straight-chain alkenyl radical having 2-6 C atoms.

The medium according to the invention particularly preferably comprises compounds of the formula IIIe in amounts of >20% by weight, in particular >25% by weight, very particularly preferably ≧30% by weight, in particular compounds selected from the compounds of the formula

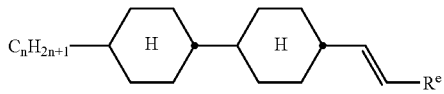

in which n=3, 4, 5 and $R^e$ denotes H or $CH_3$.

The medium according to the invention preferably comprises at least one compound of the formula IIIa, formula IIIb and/or formula IIIe.

Particularly preferred compounds of the formulae IIIe and IIIf are indicated below:

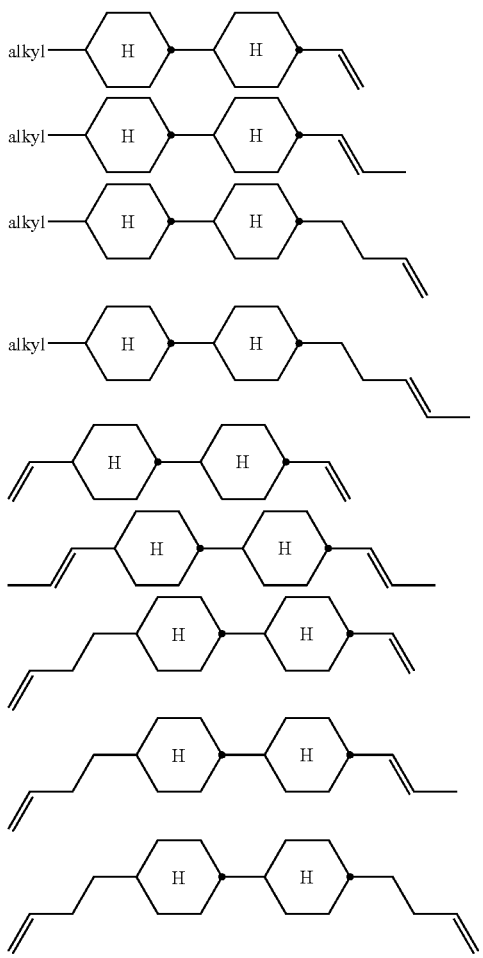

k) Liquid-crystalline medium which comprises or consists of 2-20% by weight of one or more compounds of the formula I and
20-80% by weight of one or more compounds of the formulae IIA and/or IIB.

l) Liquid-crystalline medium which additionally comprises one or more tetracyclic compounds of the formulae

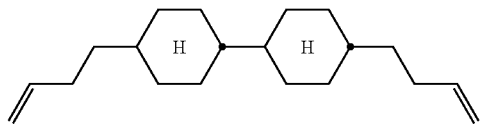

in which $R^7$ and $R^8$ each, independently of one another, have one of the meanings indicated for $R^{11}$ in Claim 1, and w and x each, independently of one another, denote 1 to 6.

m) Liquid-crystalline medium which additionally comprises one or more compounds of the formulae

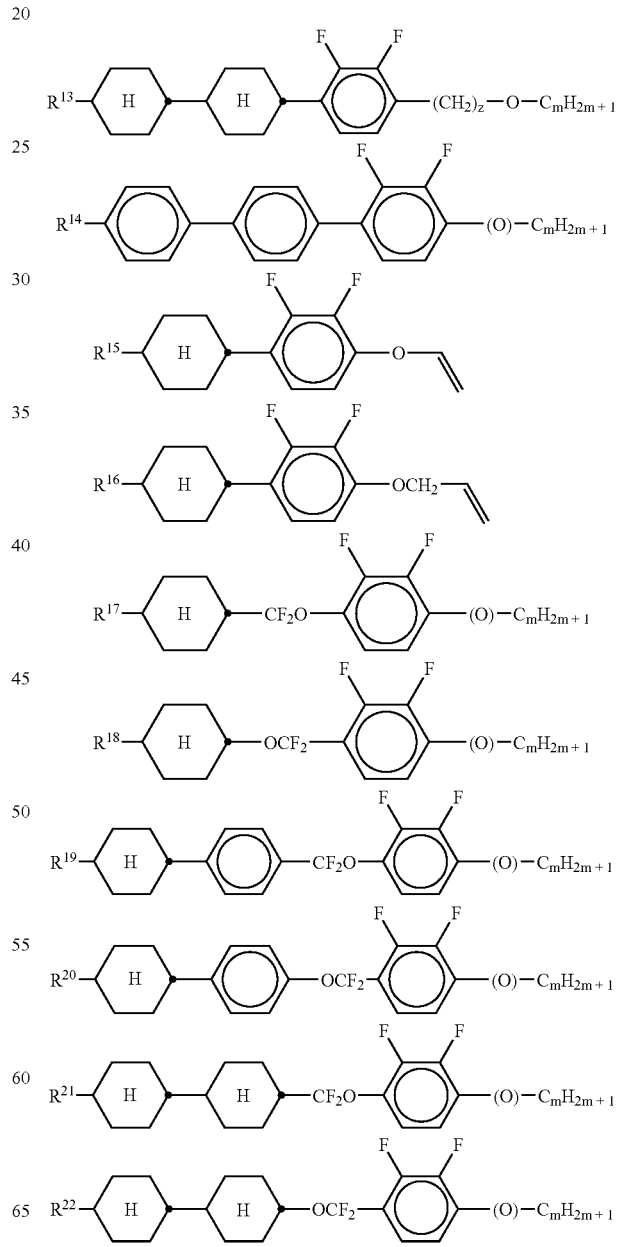

-continued

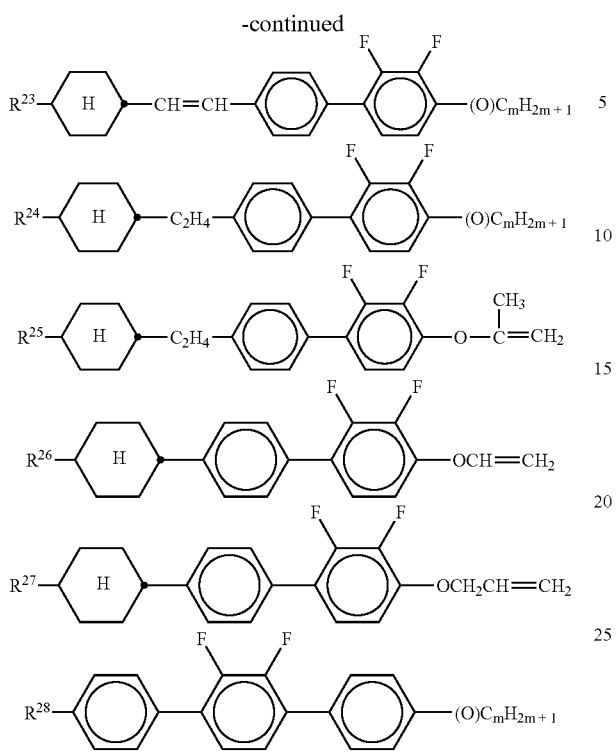

in which $R^{13}$-$R^{28}$ each, independently of one another, have the meanings indicated for $R^{11}$, and z and m each, independently of one another, denote 1-6.

n) Liquid-crystalline medium which additionally comprises one or more compounds of the formulae B-1 and/or B-2

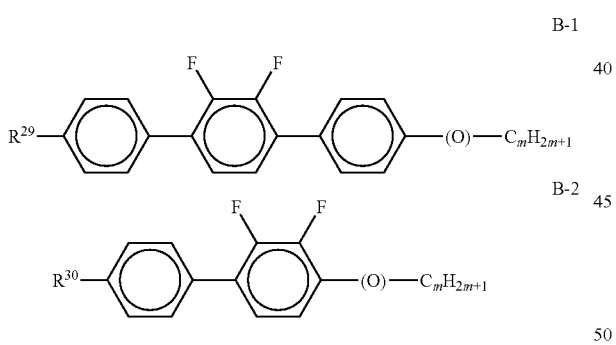

preferably in amounts of >3% by weight, in particular $\geqq$5% by weight, and very particularly preferably 5-25% by weight,
where
$R^{29-30}$ have the meanings indicated for $R^{11}$, and m denotes 1-6.

o) Liquid-crystalline medium additionally comprising one or more compounds of the formulae T-1 and/or T-2

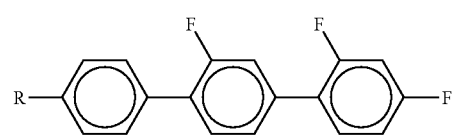

-continued

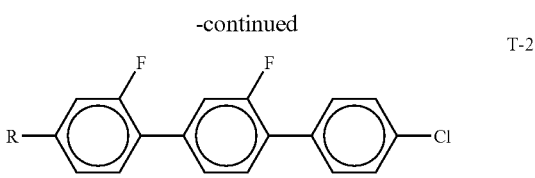

in which R denotes alkyl, alkenyl, alkoxy, alkylalkoxy, alkenyloxy having 1 or 2 to 6 C atoms respectively.

p) Liquid-crystalline medium which additionally comprises one or more compounds of the formulae

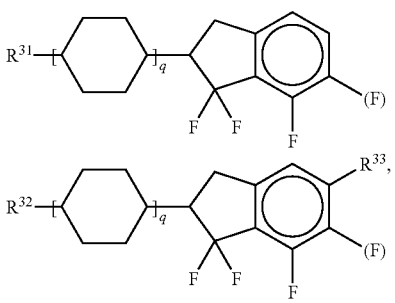

preferably in amounts of >3% by weight, in particular $\geqq$5% by weight, and very particularly preferably of 5-30% by weight,
where
$R^{31-32}$ have the meanings indicated for $R^{11}$, $R^{33}$ denotes $CH_3$, $C_2H_5$ or $n$-$C_3H_7$, and q denotes 1 or 2.

q) Liquid-crystalline medium which additionally comprises one or more compounds of the formulae

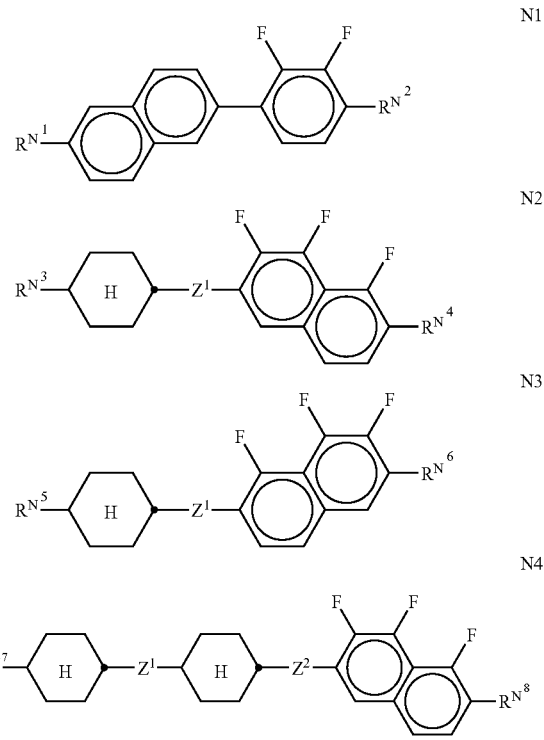

-continued

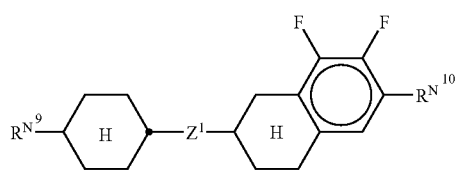

N5 in which $R^{N1}$ to $R^{N8}$, independently of one another, have the meanings indicated for $R^{11}$, and the proportion of the naphthylene compounds in the mixture is 2-40% by weight, based on the mixture.

r) Liquid-crystalline medium which additionally comprises one or more compounds of the formulae O1 and/or O2

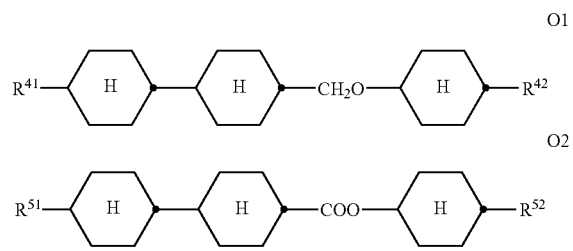

in which $R^{41}$, $R^{42}$, $R^{51}$ and $R^{52}$ have the meanings indicated for $R^{11}$. The proportion of compounds O1 and/or O2, based on the mixtures, is preferably 5-40% by weight.

The invention furthermore relates to an electro-optical display having active-matrix addressing based on the ECB effect, characterised in that it contains, as dielectric, a liquid-crystalline medium according to one of Claims 1 to 9.

The liquid-crystal mixture preferably has a nematic phase range of at least 60 K and a flow viscosity $v_{20}$ of at most 30 mm$^2 \cdot$s$^{-1}$ at 20° C.

The liquid-crystal mixture according to the invention has a $\Delta \in$ of about −0.5 to −7.0, in particular of about −2.0 to −4.0, where $\Delta \in$ denotes the dielectric anisotropy. The rotational viscosity $\gamma_1$ is preferably <180 mPa·s, in particular <150 mPa·s.

The birefringence $\Delta n$ in the liquid-crystal mixture is generally ≦0.11, preferably between 0.06 and 0.10, and in particular between 0.07 and 0.10.

The mixtures according to the invention are suitable for all VA-TFT applications, such as, for example, VAN, MVA, (S)-PVA, ASV. They are furthermore suitable for IPS (in-plane switching), FFS (fringe field switching) applications of negative $\Delta \in$.

The nematic liquid-crystal mixtures in the displays according to the invention generally comprise two components A and B, which themselves consist of one or more individual compounds.

Component A has clearly negative dielectric anisotropy and provides the nematic phase with a dielectric anisotropy of ≦−0.5. It preferably comprises compounds of the formulae I, IIA and/or IIB.

The proportion of component A is preferably between 45 and 100%, in particular between 60 and 100%.

For component A, one (or more) individual compound(s) which have a value of $\Delta \in \leqq -0.8$ are preferably selected. This value must be more negative the smaller the proportion of A in the mixture as a whole.

Component B has pronounced nematogeneity and a flow viscosity of not greater than 30 mm$^2 \cdot$s$^{-1}$, preferably not greater than 25 mm$^2 \cdot$s$^{-1}$, at 20° C.

Particularly preferred individual compounds of component B are extremely low-viscosity nematic liquid crystals having a flow viscosity of not greater than 18, preferably not greater than 12 mm$^2 \cdot$s$^{-1}$, at 20° C.

Component B is monotropically or enantiotropically nematic, has no smectic phases and can prevent the occurrence of smectic phases down to very low temperatures in liquid-crystal mixtures. If, for example, various materials of high nematogeneity are in each case added to a smectic liquid-crystal mixture, the nematogeneity of these materials can be compared through the degree of suppression of smectic phases that is achieved.

A multiplicity of suitable materials is known to the person skilled in the art from the literature. Compounds of the formula III are particularly preferred.

In addition, these liquid-crystal phases may also comprise more than 18 components, preferably 18 to 25 components.

The phases preferably comprise 4 to 15, in particular 5 to 12, compounds of the formulae I, IIA and/or IIB and optionally III.

Besides compounds of the formulae I, IIA and/or IIB and III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV $$R^9\text{-L-G-E-}R^{10} \quad \quad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline,

| G denotes | —CH=CH— | —N(O)=N— |
|---|---|---|
| | —CH=CQ- | —CH=N(O)— |
| | —C≡C— | —CH$_2$—CH$_2$— |
| | —CO—O— | —CH$_2$—O— |
| | —CO—S— | —CH$_2$—S— |
| | —CH=N— | —COO-Phe-COO— |
| | —CF$_2$O— | —CF=CF— |
| | —OCF$_2$— | —OCH$_2$— |
| | —(CH$_2$)$_4$— | —(CH$_2$)$_3$O— | or a C—C single bond, Q denotes halogen, preferably chlorine, or —CN, and $R^9$ and $R^{10}$ each denote alkyl, alkenyl, alkoxy, alkanoyloxy or alkoxycarbonyloxy having up to 18, preferably up to 8, carbon atoms, or one of these radicals alternatively denotes CN, NC, NO$_2$, NCS, CF$_3$, OCF$_3$, F, Cl or Br.

In most of these compounds, $R^9$ and $R^{10}$ are different from one another, one of these radicals usually being an alkyl or alkoxy group. Other variants of the proposed substituents are also common. Many such substances or also mixtures thereof are commercially available. All these substances can be prepared by methods known from the literature.

The liquid-crystalline mixtures according to the invention are prepared by mixing one or more compounds of the formula I with one or more further mesogenic compounds.

It goes without saying for the person skilled in the art that the VA, IPS or FFS mixture according to the invention may also comprise compounds in which, for example, H, N, O, Cl, F have been replaced by the corresponding isotopes.

The construction of the liquid-crystal displays according to the invention corresponds to the usual geometry, as described, for example, in EP-A 0 240 379.

The following examples are intended to explain the invention without limiting it. Above and below, percentages denote per cent by weight; all temperatures are indicated in degrees Celsius.

Besides the compounds of the formula I, the mixtures according to the invention preferably comprise one or more of the compounds shown below.

The following abbreviations are used:

(n, m=1-6; z=1-6)

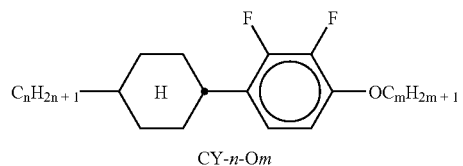

CY-n-Om

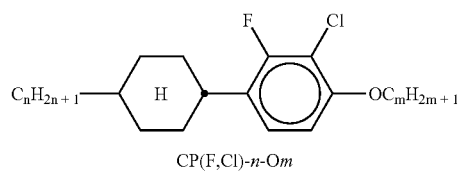

CP(F,Cl)-n-Om

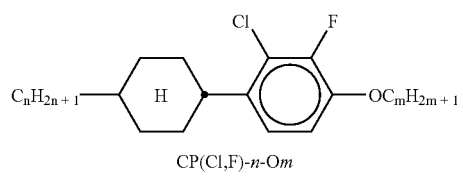

CP(Cl,F)-n-Om

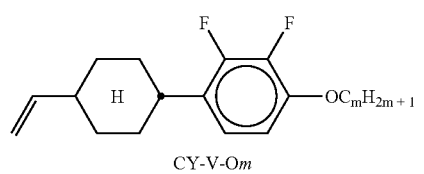

CY-V-Om

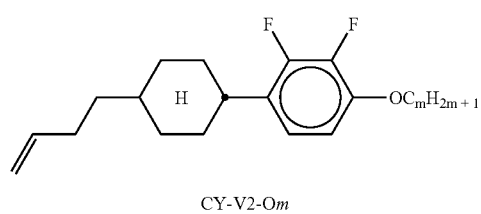

CY-V2-Om

-continued

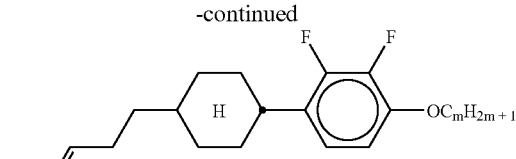

CY-1V2-Om

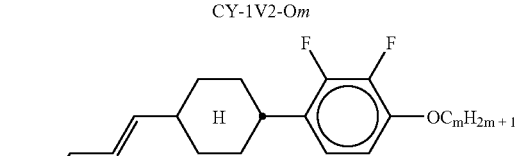

CY-3V-Om

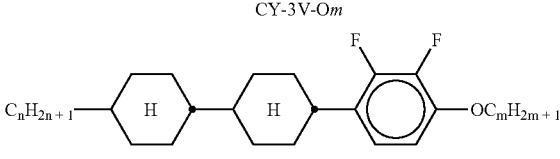

CCY-n-Om

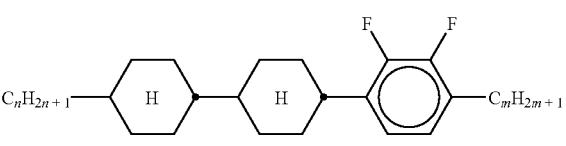

CCY-n-m

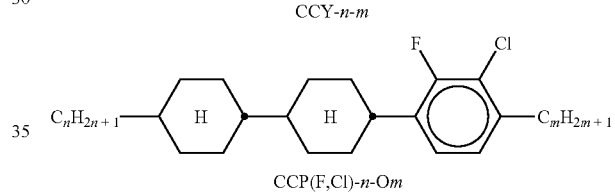

CCP(F,Cl)-n-Om

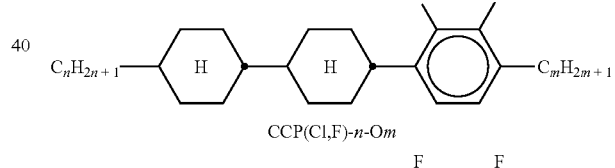

CCP(Cl,F)-n-Om

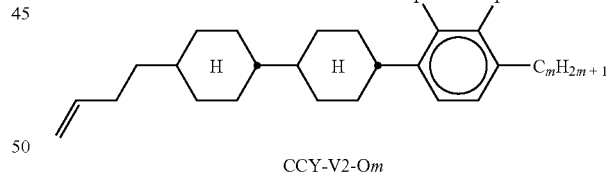

CCY-V2-Om

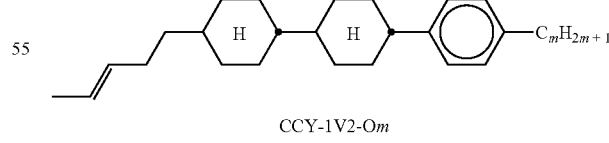

CCY-1V2-Om

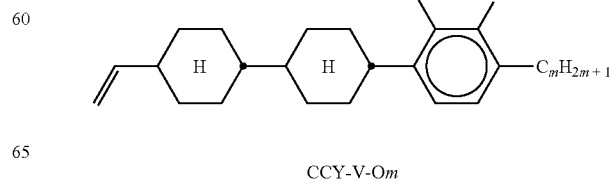

CCY-V-Om

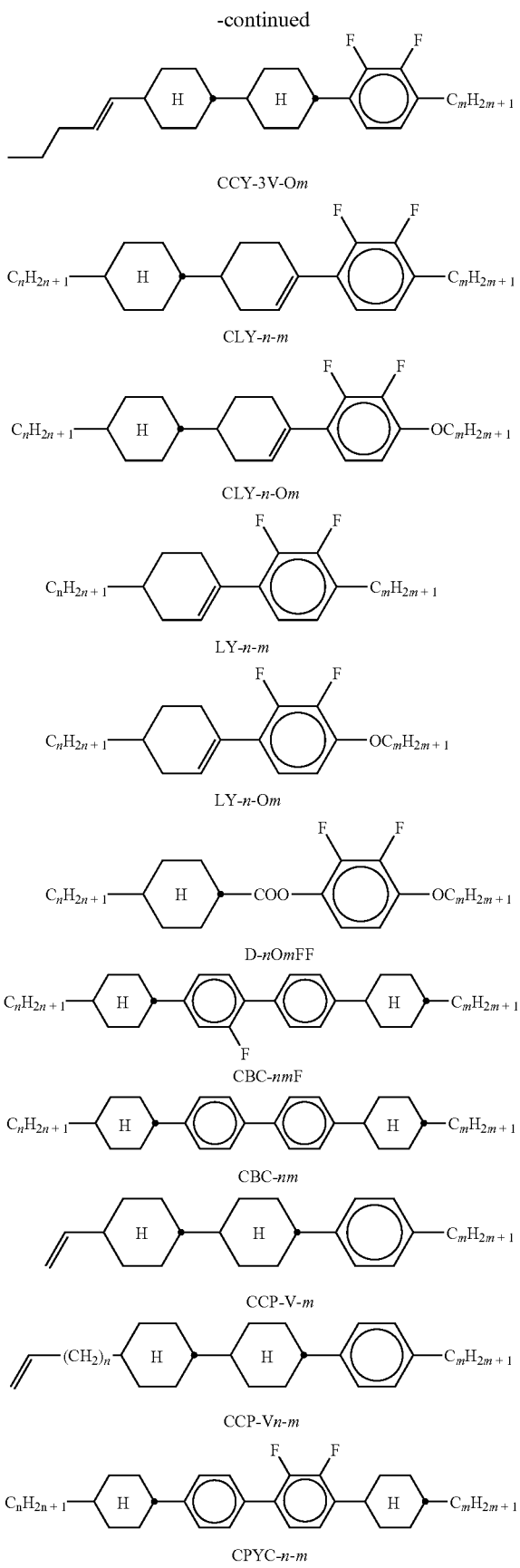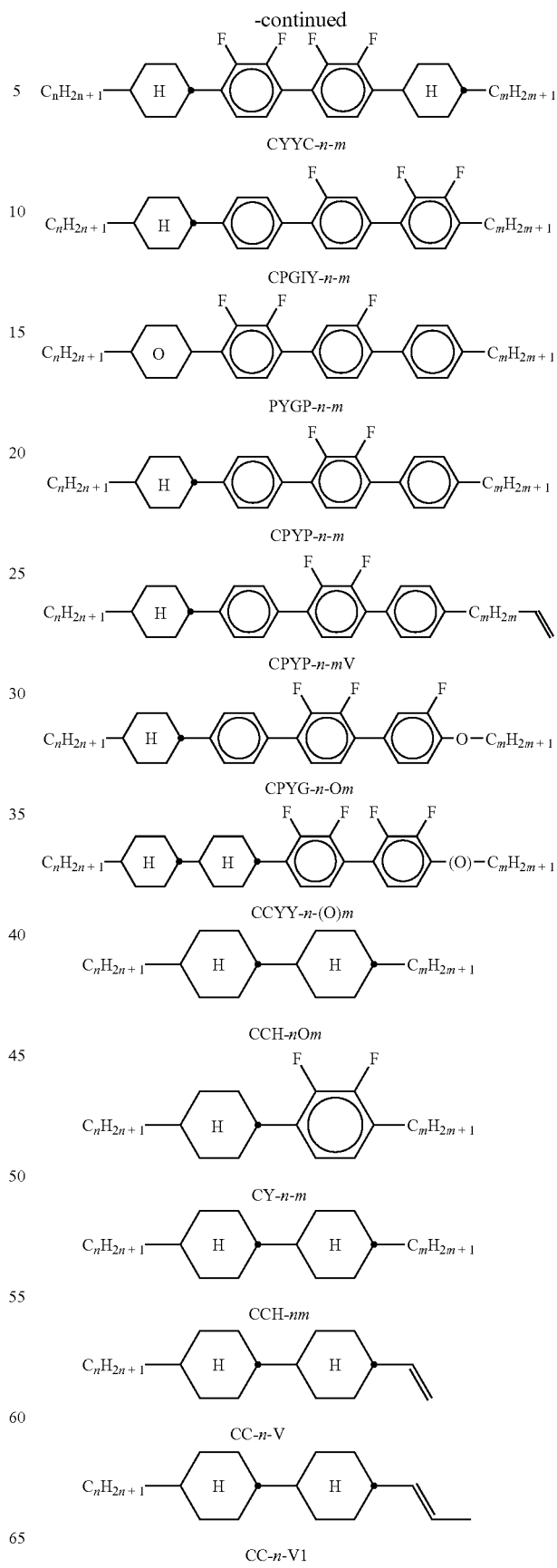

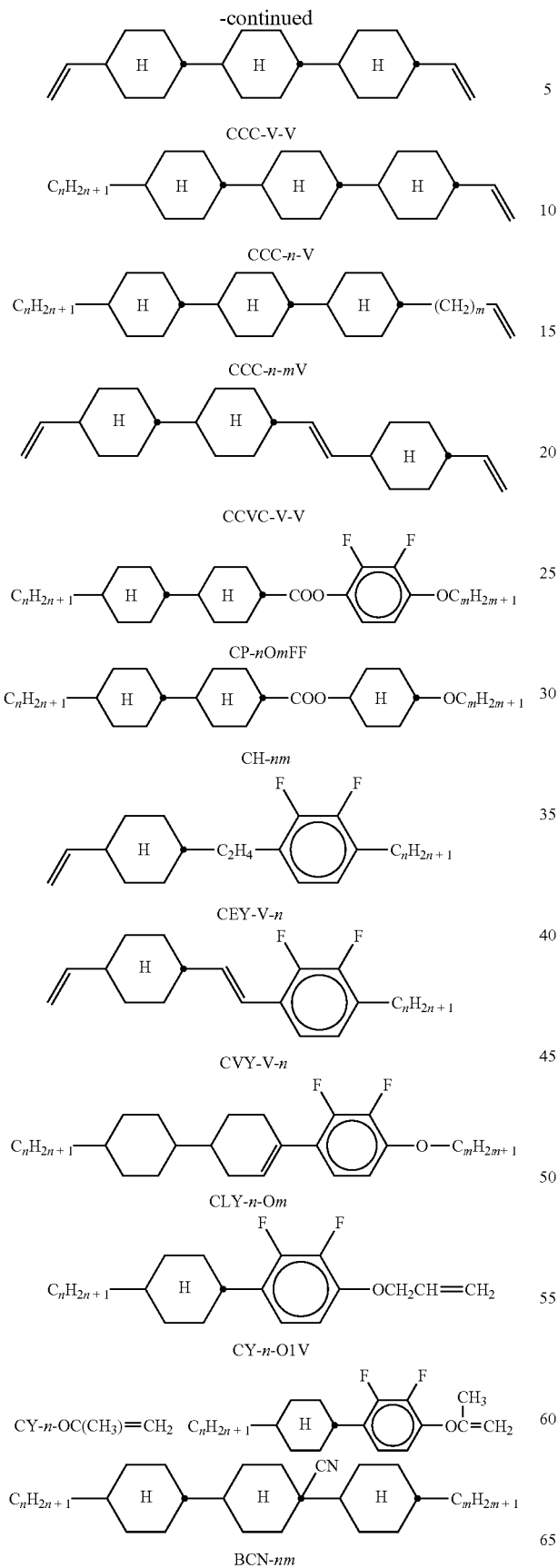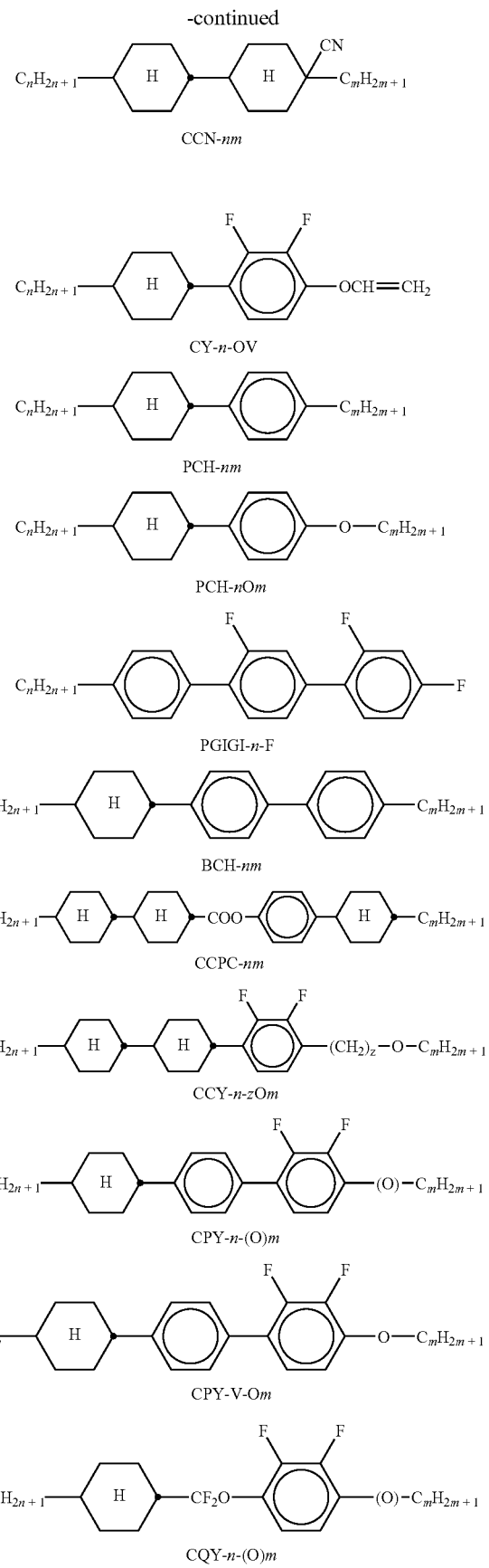

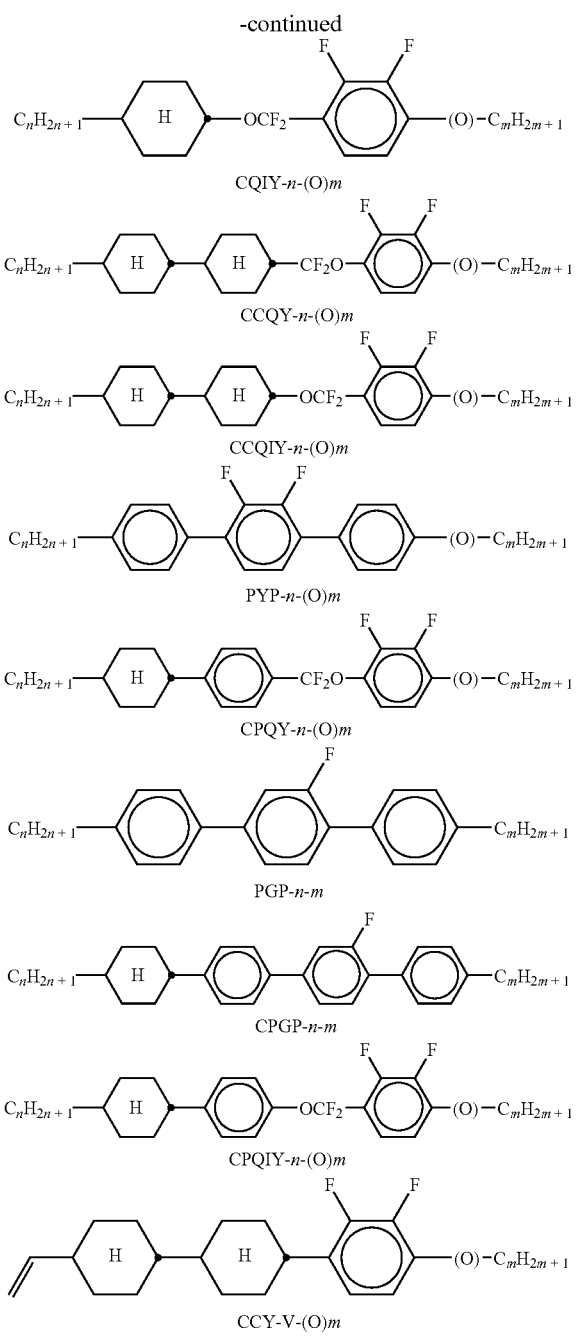

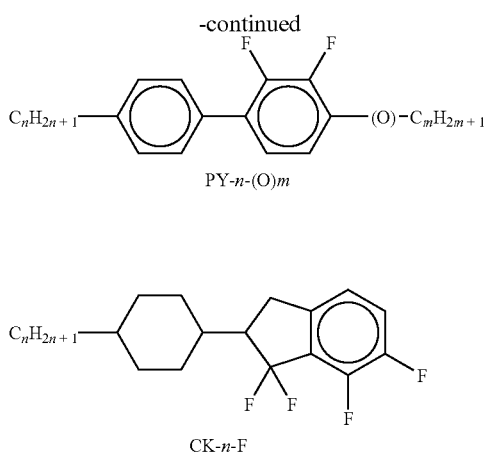

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV absorbers, antioxidants and free-radical scavengers. For example, 0-15% of pleochroic dyes, stabilisers or chiral dopants may be added.

For example, 0-15% of pleochroic dyes, furthermore conductive salts, preferably ethyldimethyldodecylammonium 4-hexoxybenzoate, tetrabutyl-ammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table A shows possible dopants which can be added to the mixtures according to the invention. If the mixtures comprise a dopant, it is employed in amounts of 0.01-4% by weight, preferably 0.1-1.0% by weight.

TABLE A

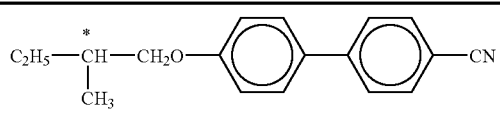

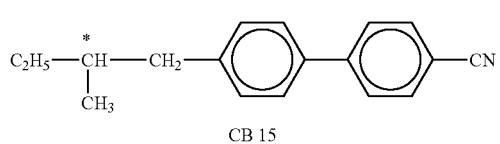

TABLE A-continued
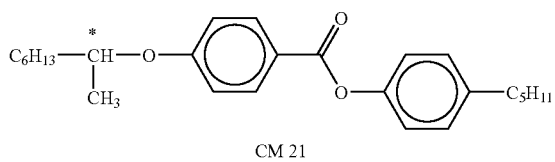
CM 21
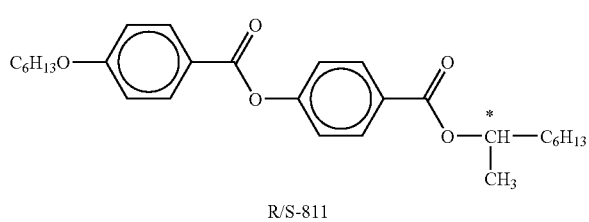
R/S-811
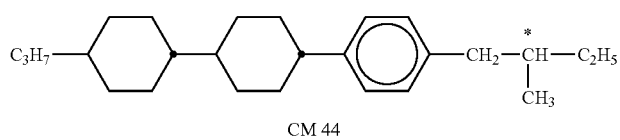
CM 44
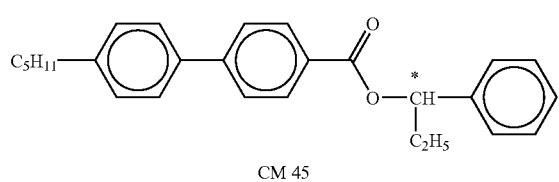
CM 45
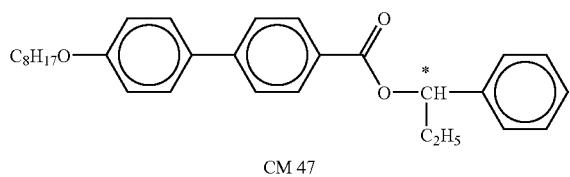
CM 47
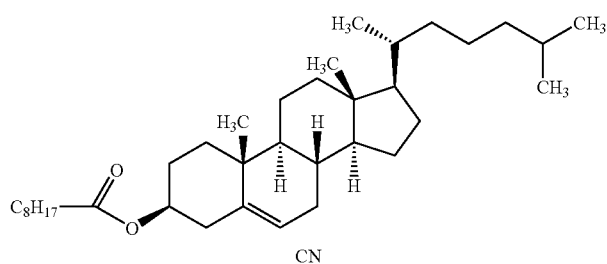
CN
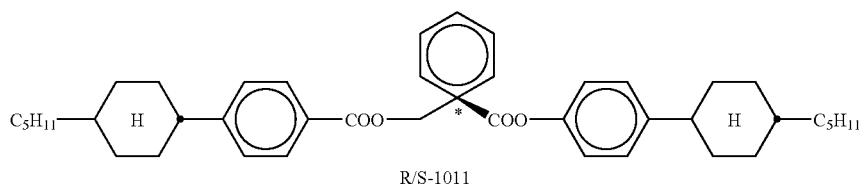
R/S-1011
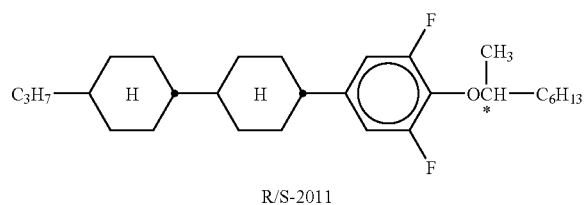
R/S-2011

TABLE A-continued
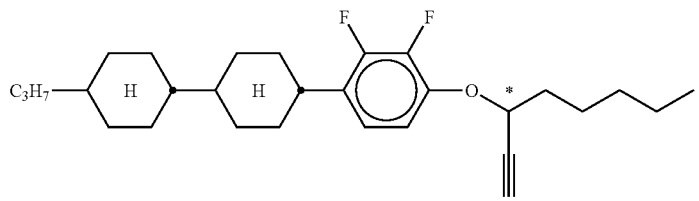
R/S-3011
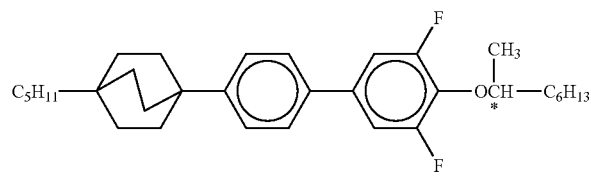
R/S-4011
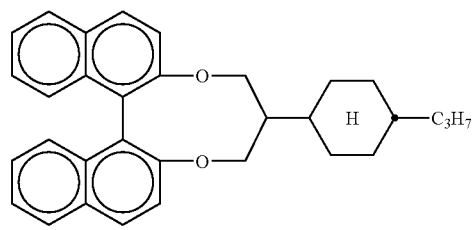
R/S-5011
Stabilisers which can be added, for example, to the mixtures according to the invention are shown below in Table B:
TABLE B
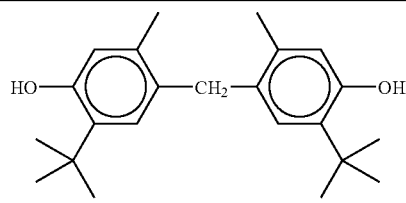   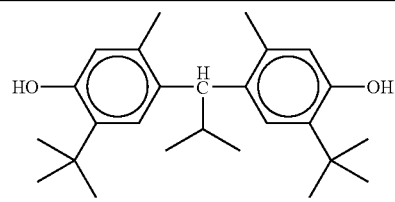
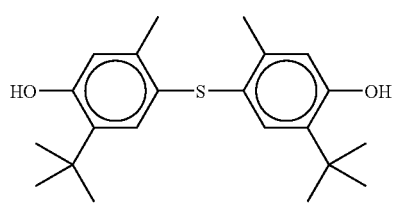   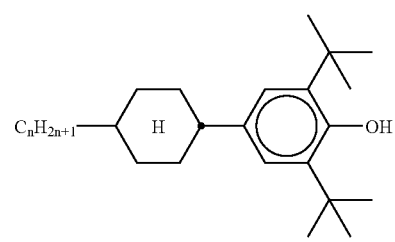
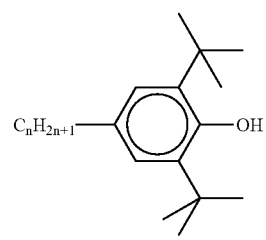   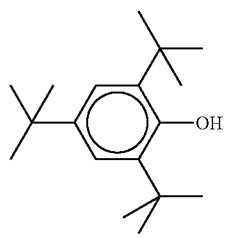

TABLE B-continued
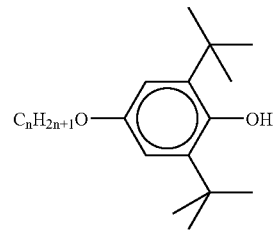
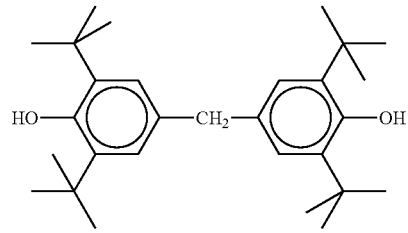
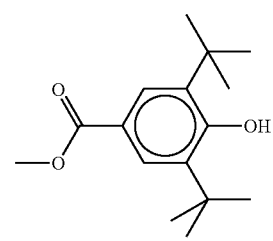
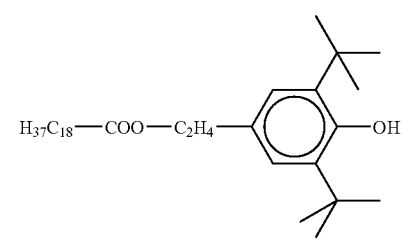
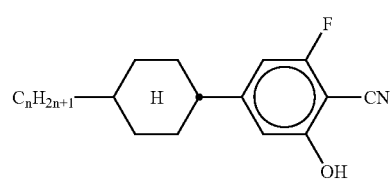
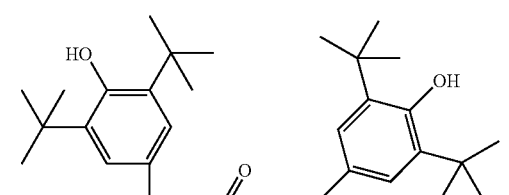
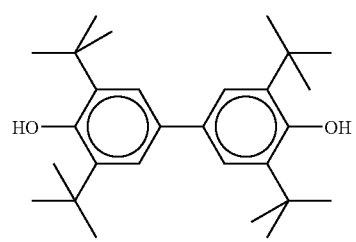
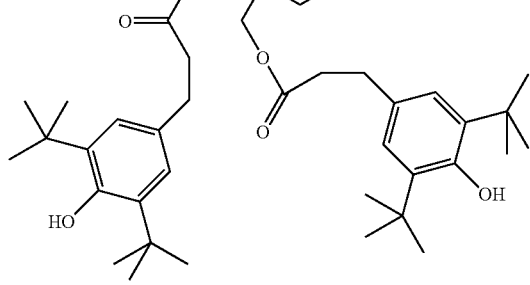
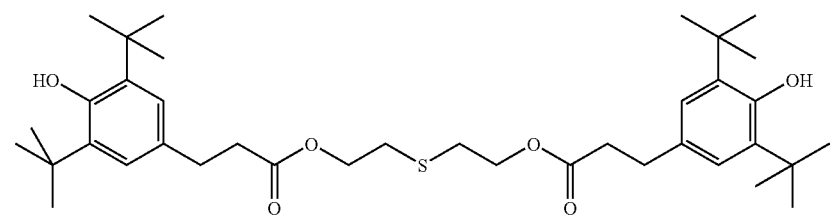

TABLE B-continued
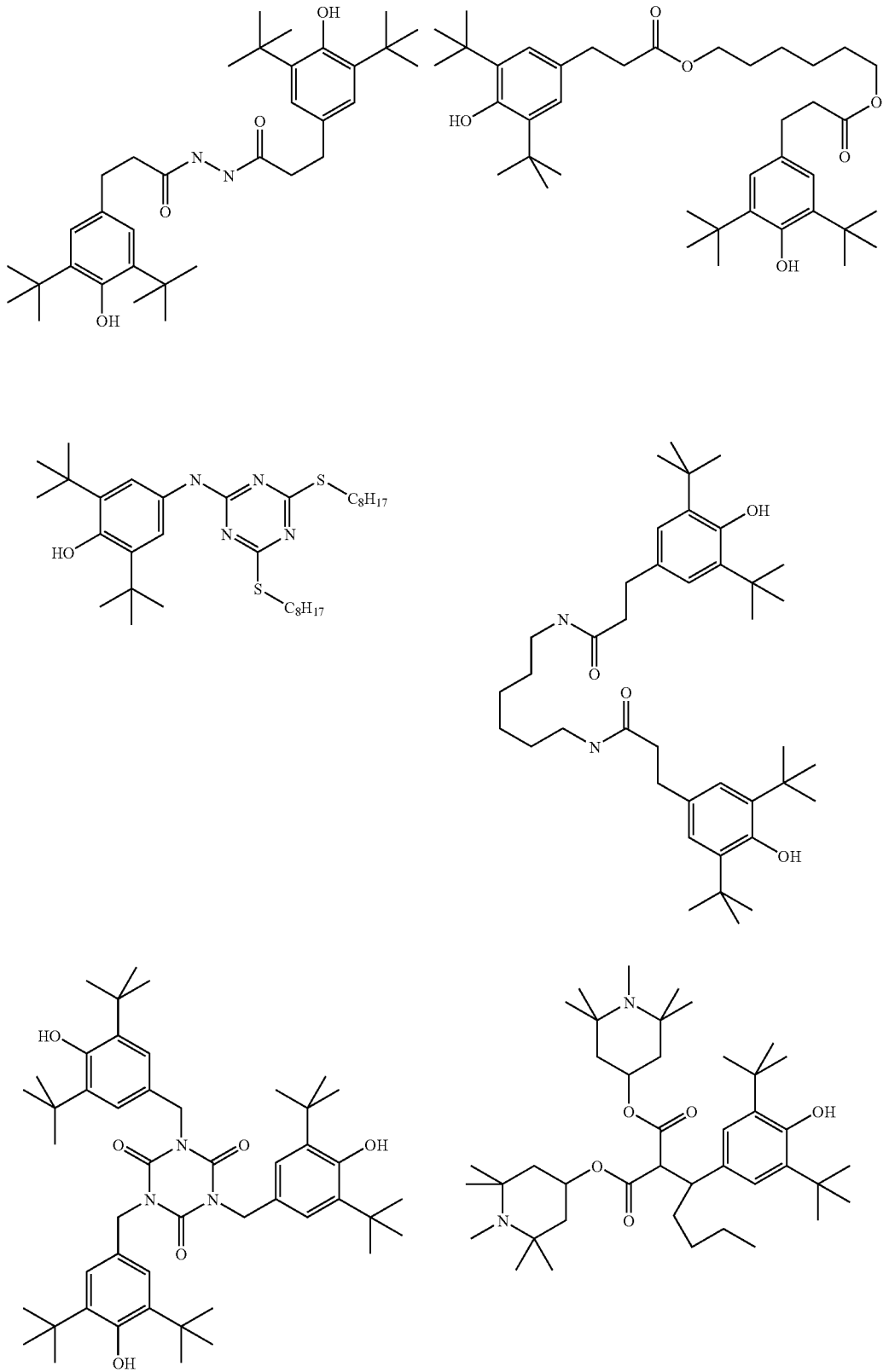

TABLE B-continued
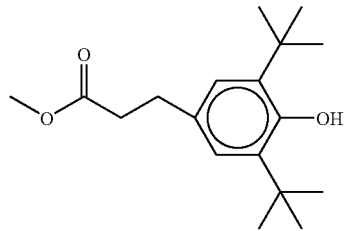
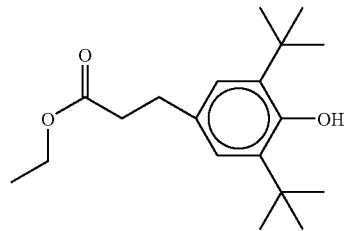
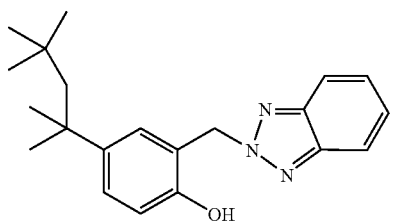
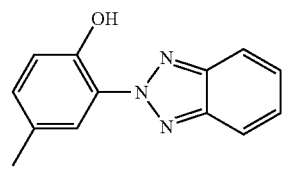
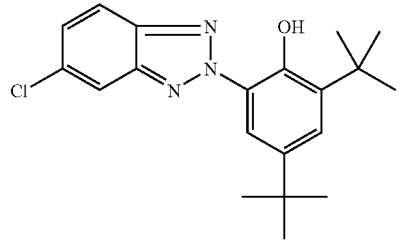
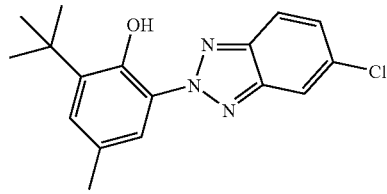
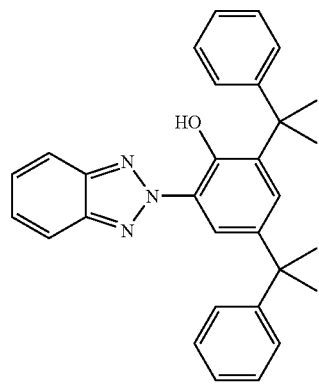
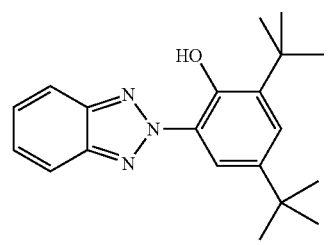
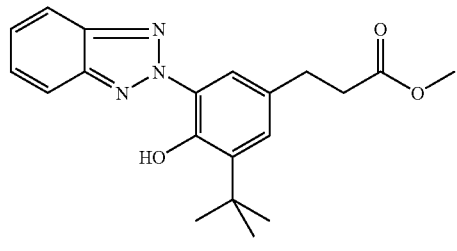
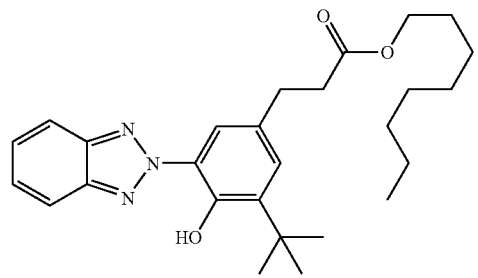

TABLE B-continued

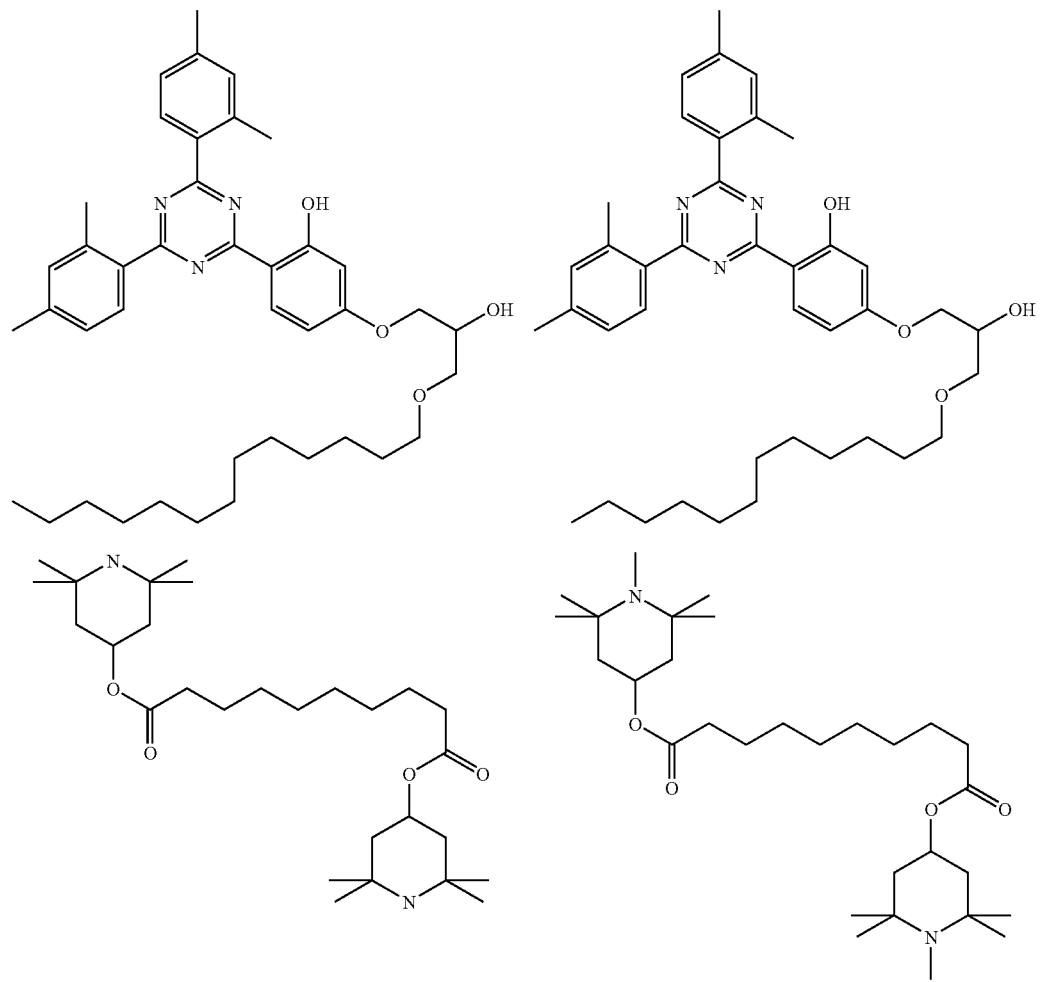

(n = 1-12)

The following examples are intended to explain the invention without limiting it. Above and below, $V_o$ denotes the threshold voltage, capacitive [V] at 20° C.

Δn denotes the optical anisotropy measured at 20° C. and 589 nm

Δε denotes the dielectric anisotropy at 20° C. and 1 kHz cl.p. denotes the clearing point [° C.]

$γ_1$ denotes the rotational viscosity measured at 20° C. [mPa·s]

LTS denotes the low-temperature stability (nematic phase), determined in test cells The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

All physical properties are and have been determined as described in "Merck Liquid Crystals, Physical Properties of Liquid Crystals", status November 1997, Merck KGaA, Germany, and apply at a temperature of 20° C., unless explicitly indicated otherwise.

All % data in this application are percent by weight, unless indicated otherwise.

MIXTURE EXAMPLES

Example 1

| CY-3-O2 | 20.00% | Clearing point [° C.]: | +89.5 |
|---|---|---|---|
| CY-5-O2 | 3.00% | Δn [589 nm, 20° C.]: | +0.0909 |
| CCY-3-O3 | 12.00% | $ε_{||}$ [1 kHz, 20° C.]: | 3.5 |
| CCY-4-O2 | 8.00% | Δε [1 kHz, 20° C.]: | −3.5 |
| CPY-2-O2 | 12.00% | $K_1$ [pN, 20° C.]: | 13.8 |
| CPY-3-O2 | 4.00% | $K_3$ [pN, 20° C.]: | 15.0 |
| CC-4-V | 20.00% | $K_3/K_1$ [pN, 20° C.]: | 1.09 |
| CC-3-V1 | 11.00% | $γ_1$ [mPa·s, 20° C.]: | 120 |
| CCVC-V-V | 10.00% | $V_0$ [V]: | 2.18 |

Example 2

| | | | |
|---|---|---|---|
| CY-3-O2 | 20.00% | Clearing point [° C.]: | +78.5 |
| CY-5-O2 | 4.00% | $\Delta n$ [589 nm, 20° C.]: | +0.0827 |
| CCY-3-O3 | 14.00% | $\epsilon_{\parallel}$ [1 kHz, 20° C.]: | 3.6 |
| CCY-4-O2 | 13.00% | $\Delta\epsilon$ [1 kHz, 20° C.]: | -3.5 |
| CPY-2-O2 | 9.00% | $K_1$ [pN, 20° C.]: | 12.3 |
| CC-3-V | 35.00% | $K_3$ [pN, 20° C.]: | 14.3 |
| CCVC-V-V | 5.00% | $K_3/K_1$ [pN, 20° C.]: | 1.16 |
| | | $\gamma_1$ [mPa·s, 20° C.]: | 92 |
| | | $V_0$ [V]: | 2.15 |
| | | LTS [-30° C.]: | nem. > 1000 h |

Example 3

| | | | |
|---|---|---|---|
| CY-5-O2 | 12.00% | Clearing point [° C.]: | +72.5 |
| CY-3-O4 | 14.00% | $\Delta n$ [589 nm, 20° C.]: | +0.0762 |
| CY-5-O4 | 16.00% | $\epsilon_{\parallel}$ [1 kHz, 20° C.]: | 3.5 |
| CCY-3-O2 | 10.00% | $\Delta\epsilon$ [1 kHz, 20° C.]: | -3.6 |
| CCY-5-O2 | 11.00% | $K_1$ [pN, 20° C.]: | 14.1 |
| CCH-35 | 8.00% | $K_3$ [pN, 20° C.]: | 14.8 |
| CC-5-V | 11.00% | $K_3/K_1$ [pN, 20° C.]: | 1.05 |
| CC-3-V1 | 12.00% | $\gamma_1$ [mPa·s, 20° C.]: | 114 |
| CCC-V-V | 6.00% | $V_0$ [V]: | 2.14 |

Example 4

| | | | |
|---|---|---|---|
| CY-3-O2 | 18.00% | Clearing point [° C.]: | +79.5 |
| CY-3-O4 | 4.00% | $\Delta n$ [589 nm, 20° C.]: | +0.0806 |
| CY-5-O2 | 11.00% | $\epsilon_{\parallel}$ [1 kHz, 20° C.]: | 3.6 |
| CCY-3-O2 | 4.00% | $\Delta\epsilon$ [1 kHz, 20° C.]: | -3.8 |
| CCY-4-O2 | 10.00% | $K_1$ [pN, 20° C.]: | 14.1 |
| CCY-3-O3 | 12.00% | $K_3$ [pN, 20° C.]: | 15.3 |
| CPY-2-O2 | 4.00% | $K_3/K_1$ [pN, 20° C.]: | 1.09 |
| CC-5-V | 20.00% | $\gamma_1$ [mPa·s, 20° C.]: | 116 |
| CC-3-V1 | 12.00% | $V_0$ [V]: | 2.13 |
| CCC-3-V | 5.00% | | |

Example 5

| | | | |
|---|---|---|---|
| CY-3-O2 | 13.00% | Clearing point [° C.]: | +74.5 |
| CY-3-O4 | 9.00% | $\Delta n$ [589 nm, 20° C.]: | +0.0834 |
| CY-5-O2 | 12.00% | $\epsilon_{\parallel}$ [1 kHz, 20° C.]: | 3.5 |
| CCY-3-O2 | 12.00% | $\Delta\epsilon$ [1 kHz, 20° C.]: | -3.5 |
| CCY-5-O2 | 3.00% | $K_1$ [pN, 20° C.]: | 14.1 |
| CPY-2-O2 | 11.00% | $K_3$ [pN, 20° C.]: | 14.7 |
| CCH-35 | 7.00% | $K_3/K_1$ [pN, 20° C.]: | 1.04 |
| CC-5-V | 20.00% | $\gamma_1$ [mPa·s, 20° C.]: | 106 |
| CC-3-V1 | 8.00% | $V_0$ [V]: | 2.15 |
| CCC-3-V | 5.00% | | |

Example 6

| | | | |
|---|---|---|---|
| CY-3-O2 | 20.00% | Clearing point [° C.]: | +80.0 |
| CY-3-O4 | 5.00% | $\Delta n$ [589 nm, 20° C.]: | +0.0823 |
| CY-5-O2 | 6.00% | $\epsilon_{\parallel}$ [1 kHz, 20° C.]: | 3.6 |
| CCY-3-O2 | 3.00% | $\Delta\epsilon$ [1 kHz, 20° C.]: | -3.7 |
| CCY-4-O2 | 10.00% | $K_1$ [pN, 20° C.]: | 14.2 |
| CCY-3-O3 | 12.00% | $K_3$ [pN, 20° C.]: | 15.4 |
| CPY-2-O2 | 6.00% | $K_3/K_1$ [pN, 20° C.]: | 1.09 |
| CC-5-V | 20.00% | $\gamma_1$ [mPa·s, 20° C.]: | 115 |
| CC-3-V1 | 13.00% | $V_0$ [V]: | 2.15 |
| CCC-3-V | 5.00% | | |

Example 7

| | | | |
|---|---|---|---|
| CY-3-O2 | 20.00% | Clearing point [° C.]: | +80.0 |
| CY-5-O2 | 13.00% | $\Delta n$ [589 nm, 20° C.]: | +0.0826 |
| CCY-4-O2 | 10.00% | $\epsilon_{\parallel}$ [1 kHz, 20° C.]: | 3.5 |
| CCY-3-O3 | 11.00% | $\Delta\epsilon$ [1 kHz, 20° C.]: | -3.6 |
| CPY-2-O2 | 7.00% | $K_1$ [pN, 20° C.]: | 14.3 |
| CC-5-V | 20.00% | $K_3$ [pN, 20° C.]: | 15.1 |
| CC-3-V1 | 12.00% | $K_3/K_1$ [pN, 20° C.]: | 1.06 |
| CCC-3-V | 4.00% | $\gamma_1$ [mPa·s, 20° C.]: | 114 |
| CCC-3-2V | 3.00% | $V_0$ [V]: | 2.16 |

The invention claimed is:

1. A liquid-crystalline medium comprising a mixture of polar compounds, containing at least one compound of Formula I

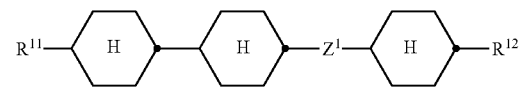

in which $R^{11}$ and $R^{12}$ each, independently of one another, denote an alkyl or alkenyl radical having up to 15 C atoms which is unsubstituted, where, in addition, one or more $CH_2$ groups in these radicals may be replaced by —O—, —S—,

, —C≡C—, —OC—O— or —O—CO— in such a way that O atoms are not linked directly to one another, with the proviso that at least one of the radicals $R^{11}$ and $R^{12}$ denotes alkenyl having 2 to 6 C atoms, and $Z^1$ denotes —CH═CH— or a single bond, and one or more compounds of Formula IIA and/or IIB:

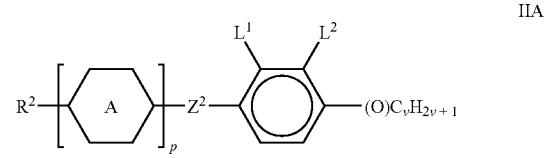

-continued

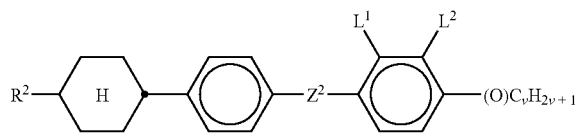
IIB in which

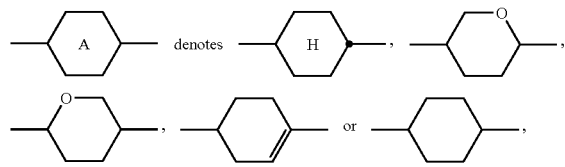

R² denotes an alkyl or alkenyl radical having up to 15 C atoms which is unsubstituted, monosubstituted by CN or CF₃ or at least monosubstituted by halogen, where, in addition, one or more CH₂ groups in these radicals may be replaced by —O—, —S—,

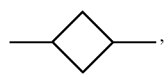

—C≡C—, —OC—O— or —O—CO— in such a way that O atoms are not linked directly to one another, $Z^2$ denotes a single bond, —CH=CH— or —CH₂CH₂—, p denotes 1 or 2, and $L^1$ and $L^2$ each, independently of one another, denote F, Cl, OCF₃, CF₃, CH₃, CH₂F, CHF₂, and v denotes 1 to 6.

2. The liquid-crystalline medium according to claim 1, further comprising one or more compounds of Formula III which are not identical with the compound of the formula I

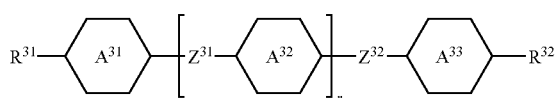
III in which $R^{31}$ and $R^{32}$ each, independently of one another, denote an alkyl or alkenyl radical having up to 15 C atoms which is unsubstituted, monosubstituted by CN or CF₃ or at least monosubstituted by halogen, where, in addition, one or more CH₂ groups in these radicals may be replaced by —O—, —S—,

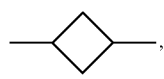

—C≡C—, —OC—O— or —O—CO— in such a way that O atoms are not linked directly to one another,

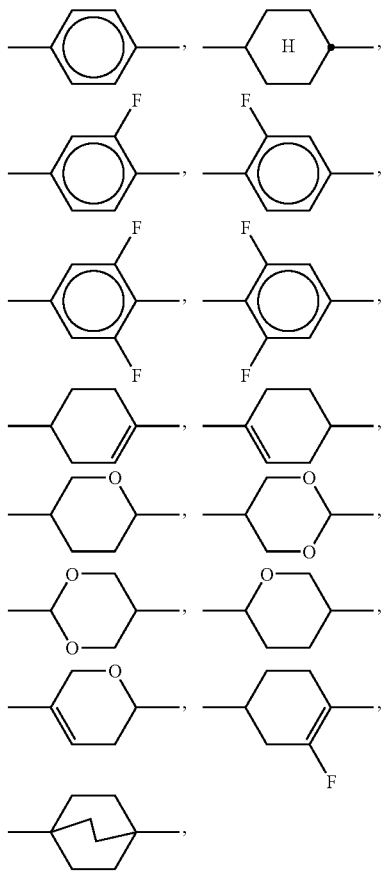

each, independently of one another, denote r denotes 0, 1 or 2, $Z^{31}$ and $Z^{32}$ each, independently of one another, denote a single bond, —CH₂CH₂—, —C≡C—, —CH=CH—, —CF₂O—, —OCF₂—, —CF=CF—, —CF=CH—, —CH=CF—, —CH₂CF₂—, —CF₂CH₂—, —COO—, —OCO—, —CH₂O—, —OCH₂—, —(CH₂)₄—.

3. The liquid-crystalline medium according to claim 1, comprising one, two, three, four or more compounds of the Formula I.

4. The liquid-crystalline medium according to claim 1, having a proportion of compounds of Formula I in the mixture as a whole of at least 2% by weight.

5. The liquid-crystalline medium according to claim 1, having a proportion of compounds of Formula IIA and/or IIB in the mixture as a whole of at least 20% by weight.

6. The liquid-crystalline medium according to claim 2, having a proportion of compounds of III in the mixture as a whole of at least 3% by weight.

7. The liquid-crystalline medium according to claim 1, comprising at least one compound selected from the groups consisting of formulae I1a to I1g and I2a to I2h:

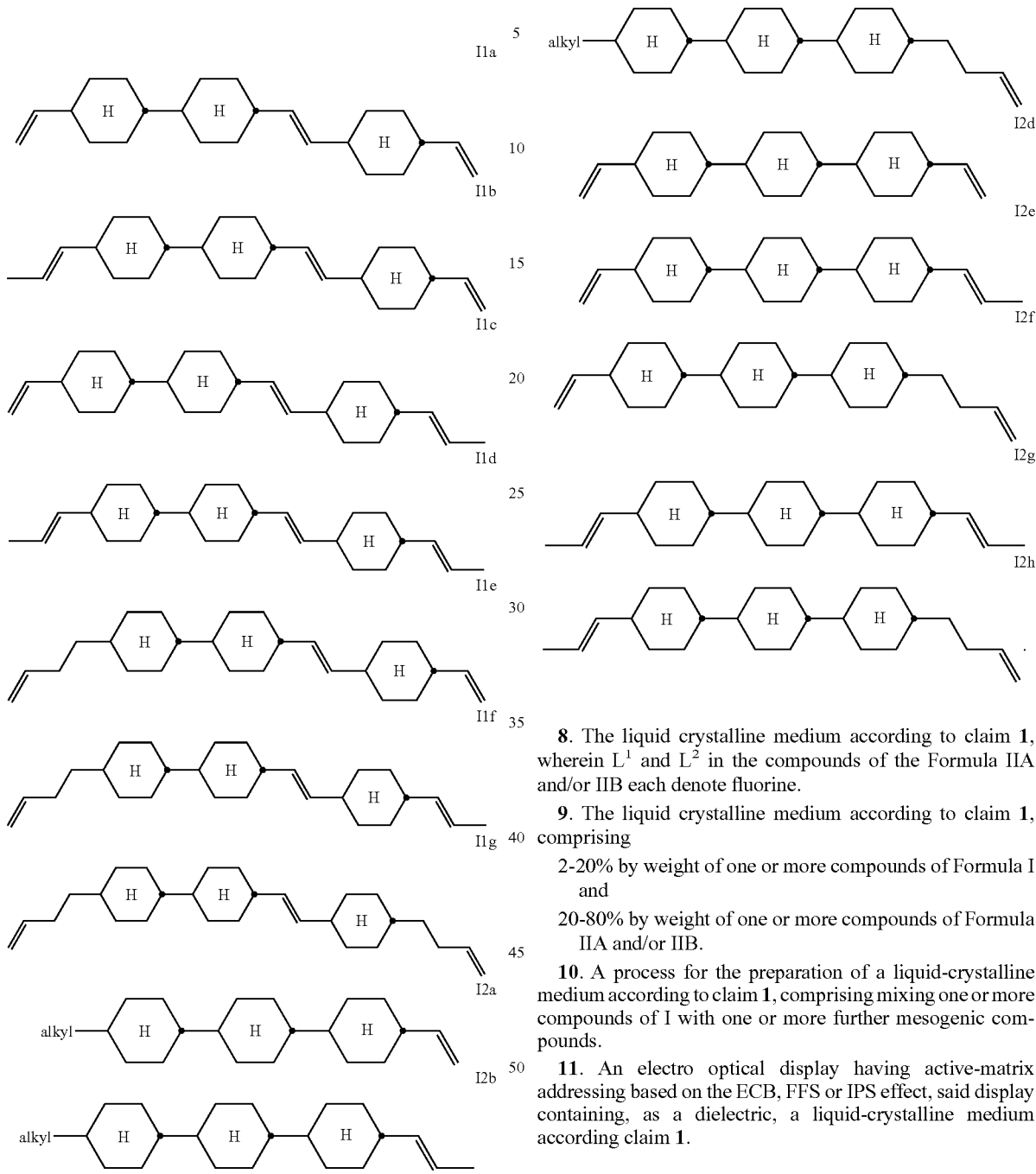

8. The liquid crystalline medium according to claim 1, wherein $L^1$ and $L^2$ in the compounds of the Formula IIA and/or IIB each denote fluorine.

9. The liquid crystalline medium according to claim 1, comprising 2-20% by weight of one or more compounds of Formula I and 20-80% by weight of one or more compounds of Formula IIA and/or IIB.

10. A process for the preparation of a liquid-crystalline medium according to claim 1, comprising mixing one or more compounds of I with one or more further mesogenic compounds.

11. An electro optical display having active-matrix addressing based on the ECB, FFS or IPS effect, said display containing, as a dielectric, a liquid-crystalline medium according claim 1.

* * * * *